(12) United States Patent
Grover et al.

(10) Patent No.: US 8,279,910 B2
(45) Date of Patent: Oct. 2, 2012

(54) METHOD AND APPARATUS FOR CODE SPACE SEARCH IN A RECEIVER

(75) Inventors: Douglas Grover, San Diego, CA (US); Christopher Patrick, San Diego, CA (US); Kai Tang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1420 days.

(21) Appl. No.: 11/681,183

(22) Filed: Mar. 2, 2007

(65) Prior Publication Data

US 2007/0206663 A1    Sep. 6, 2007

Related U.S. Application Data

(60) Provisional application No. 60/779,172, filed on Mar. 2, 2006, provisional application No. 60/885,523, filed on Jan. 18, 2007.

(51) Int. Cl.
*H04B 1/00* (2006.01)
(52) U.S. Cl. .................. 375/149; 375/145; 342/357.29; 342/357.69
(58) Field of Classification Search .................. None
See application file for complete search history.

(56) References Cited

U.S. PATENT DOCUMENTS 4,998,111 A    3/1991    Ma et al.
5,434,970 A    7/1995    Schiffleger et al.
(Continued)

FOREIGN PATENT DOCUMENTS

JP    2001237744    8/2001
(Continued)

OTHER PUBLICATIONS

Akos et al., "Tuning in to GPS Real-Time Software Radio Architecture for GPS Receivers", GPS World, vol. 12, No. 7, Jul. 2001, pp. 28-33.

(Continued)

*Primary Examiner* — Hassan Phillips
*Assistant Examiner* — Ajay Cattungal
(74) *Attorney, Agent, or Firm* — Andrea Mays; Howard H. Seo

(57) ABSTRACT

Apparatus and methods of implementing code space search of received signals are described herein. A code space search is implemented as a searcher that perform a subtask that is dynamically reconfigurable at each boundary of an initial integration time. Each particular subtask sets forth a programmable configuration of coherent integration hypothesis that are performed during the initial integration time. The searcher stores the results of the coherent integration hypothesis in a first portion of memory. A search accelerator operates on the initial integration results. The search accelerator can perform coherent integration of various frequency bins of different timing hypothesis, can generate energy values of the coherent integration results, and can generate a non-coherent energy summation. The energy values of the coherent integrations and non-coherent energy summations are stored in a second portion of memory. The ability to reconfigure the subtasks and accelerator operation provides flexibility in search space dimensions.

35 Claims, 5 Drawing Sheets

U.S. PATENT DOCUMENTS

| | | | |
|---|---|---|---|
| 5,592,173 A | 1/1997 | Lau et al. | |
| 6,583,758 B2 | 6/2003 | King | |
| 6,836,241 B2* | 12/2004 | Stone et al. | 342/357.63 |
| 7,729,412 B2* | 6/2010 | Stein et al. | 375/150 |
| 7,994,976 B2* | 8/2011 | Chen et al. | 342/357.63 |
| 2003/0128747 A1* | 7/2003 | Poon et al. | 375/148 |
| 2003/0132878 A1* | 7/2003 | Devereux et al. | 342/357.06 |
| 2003/0147365 A1* | 8/2003 | Terasawa et al. | 370/335 |
| 2005/0254560 A1* | 11/2005 | Huang | 375/150 |
| 2005/0270997 A1* | 12/2005 | Julien et al. | 370/315 |
| 2006/0223549 A1* | 10/2006 | Chang | 455/456.2 |
| 2007/0019714 A1* | 1/2007 | Bochkovskiy et al. | 375/150 |
| 2007/0183487 A1* | 8/2007 | Genghi | 375/150 |
| 2007/0195866 A1* | 8/2007 | Seibert et al. | 375/150 |
| 2009/0040103 A1* | 2/2009 | Chansarkar et al. | 342/357.12 |
| 2009/0225816 A1* | 9/2009 | Cheng et al. | 375/150 |
| 2010/0222076 A1* | 9/2010 | Poon et al. | 455/456.1 |

FOREIGN PATENT DOCUMENTS

| | | | |
|---|---|---|---|
| JP | 2003512595 A | 4/2003 | |
| JP | 2005507502 A | 3/2005 | |
| JP | 2005513510 A | 5/2005 | |
| JP | 2006501775 A | 1/2006 | |
| JP | 2007221768 | 8/2007 | |
| WO | WO2004032361 A1 | 4/2004 | |
| WO | 2005/022187 A2 | 3/2005 | |
| WO | WO2005074153 | 8/2005 | |

OTHER PUBLICATIONS

Akopian et al., "Fast and Parallel Matched Filters in Time Domain", The Institute of Navagation, ION GNSS 17th International Technical Meeting of the Satellite Division, Sep. 21-24, 2004, pp. 491-500, Long Beach, CA, USA.

Gerein et al., Modular GPS Software Radio Architecture: "Modular GPS Software Radio Architecture", The Institute of Navagation, ION GPS 2001, Oniine Article, Sep. 11, 2001, pp. 2048-2058, Salt Lake City, UT, USA.

Krumvieda et al., "A Complete IF Software GPS Receiver: A Tutorial about the Details", The institute of Navagation, GPS 2001, Sep. 11-14, 2001, pp. 789-629, Salt Lake City, UT, USA.

LIN et al., "Comparison of Acquistion Methods for Software GPS Receiver", The Institute of Navagation, GPS 2000, Sep. 19-22, 2000, pp. 2335-2390, Salt Lake City, UT, USA.

International Search Report, PCT/US2004/028542, International Search Authority/EPO, May 30, 2005, (1 page).

Internationai Search Report, PCT/US2007/063225, International Search Authority/EPO, Jun. 26, 2007, (4 pages).

Written Opinion-PCT/US2007/063225, International Search Authority, European Patent Office, Jun. 26, 2007.

Taiwan Search Report—TW096107238—TIPO—Aug. 2, 2011.

* cited by examiner

METHOD AND APPARATUS FOR CODE SPACE SEARCH IN A RECEIVER

CROSS-REFERENCE TO RELATED APPLICATIONS

The present application claims priority to provisional U.S. Application Ser. No. 60/779,172, entitled "Long Coherent Integration Apparatus and Method for Signal Acquisition," filed Mar. 2, 2006, and claims priority to provisional U.S. Application Ser. No. 60/885,323, entitled "Method and Apparatus for Code Space Search in a Receiver," filed Jan. 17, 2007, both of which are assigned to the assignee hereof and are incorporated herein by reference.

BACKGROUND

The present disclosure relates to position location of a wireless communication device. More particularly, the present disclosure relates to reconfigurable system for code space search in a wireless communication device.

Many wireless communication utilize direct sequence spread spectrum to communicate information. The codes used to spread a signal are typically pseudo random codes. A receiver typically recovers the underlying information by correlating the spreading code with a locally generated code.

A receiver can sometimes utilize a time offset associated with the codes to establish a timing reference that can be used to perform position location. Determining position based on timing established from pseudo random spread signals is performed in various position location systems.

For example, tThe Global Positioning System (GPS) navigation system employs satellites that are in orbit around the Earth. Any user of GPS, anywhere on Earth, can derive precise navigation information including 3-dimensional position, velocity and time of day. The GPS system includes 24 satellites that are deployed in circular orbits with radii of 26,600 kilometers in three planes inclined at 55° with respect to the equator and spaced 120° with respect to one another. Eight satellites are equally spaced within each of the three orbit paths. Position measurements using GPS are based on measurements of propagation delay times of GPS signals broadcast from the orbiting satellites to a GPS receiver. Normally, reception of signals from 4 satellites is required for precise position determination in 4 dimensions (latitude, longitude, altitude, and time). Once the receiver has measured the respective signal propagation delays, the range to each satellite is calculated by multiplying each delay by the speed of light. Then, the location and time are found by solving a set of four equations with four unknowns incorporating the measured ranges and the known locations of the satellites. The precise capabilities of the GPS system are maintained by means of on-board atomic clocks for each satellite and by ground tracking stations that continuously monitor and correct satellite clock and orbit parameters.

Each GPS satellite transmits two direct-sequence-coded spread spectrum signals in the L-band. An L1 signal at a carrier frequency of 1.57542 GHz, and an L2 signal at 1.2276 GHz. The L1 signal consists of two phase-shift keyed (PSK) spread spectrum signals modulated in phase quadrature. The P-code signal (P for precise), and the C/A-code signal (C/A for coarse/acquisition). The L2 signal contains only the P-code signal. The P and C/A codes are repetitive pseudo-random sequences of bits (also referred to as "chips") that are modulated onto the carriers. The clock-like nature of these codes is utilized by the receiver in making time delay measurements. The codes for each satellite are unique, allowing the receiver to distinguish which satellite transmitted a given code, even though they are all at the same carrier frequency. Also modulated onto each carrier is a 50 bit/sec data stream that contains information about system status and satellite orbit parameters, which are needed for the navigation calculations. The P-code signals are encrypted, and are not generally available for commercial and private users. The C/A signal is available to all users.

The operations performed in a GPS receiver are for the most part typical of those performed in any direct-sequence spread spectrum receiver. The spreading effect of the pseudo-random code modulation must be removed from each signal by multiplying it by a time-aligned, locally-generated copy of the code, in a process known as despreading. Since the appropriate time alignment, or code delay, is unlikely to be known at receiver start-up, it must be determined by searching during the initial "acquisition" phase of a GPS receiver's operation. Once determined, proper code time-alignment is maintained during the "tracking" phase of GPS receiver operation.

Once the received signal is despread, each signal consists of a 50 bit/sec PSK signal at an intermediate carrier frequency. The exact frequency of this signal is uncertain due to the Doppler effect caused by relative movement between satellite and terminal unit, and to local receiver GPS clock reference error. During initial signal acquisition this Doppler frequency must also be searched for, since it is usually unknown prior to acquisition. Once the Doppler frequency is approximately determined, carrier demodulation proceeds.

After carrier demodulation, data bit timing is derived by a bit synchronization loop and the data stream is finally detected. A navigation calculation may be undertaken once the signals from 4 satellites have been acquired and locked onto, the necessary time delay and Doppler measurements have been made, and a sufficient number of data bits (enough to determine the GPS time reference and orbit parameters) have been received.

One drawback of the GPS system for location determination is the long time needed for the initial signal acquisition phase. As mentioned above, before the four satellite signals can be tracked they must be searched for in a two-dimensional search "space", whose dimensions are code-phase delay, and Doppler frequency shift. Typically, if there is no prior knowledge of a signal's location within this search space, as would be the case after a receiver "cold start", a large number of code delays (about 2000) and Doppler frequencies (about 15) must be searched for each satellite that is to be acquired and tracked. Thus, for each signal, up to 30,000 locations in the search space must be examined. Typically these locations are examined one-at-a-time sequentially, a process which can take 5 to 10 minutes. The acquisition time is further lengthened if the identities (i.e., PN-codes) of the four satellites within view of the receiving antenna are unknown.

In the case where a GPS receiver has already acquired the satellite signals and is then in tracking mode, the position determination process is virtually instantaneous. However, in the routine use of wireless terminals, users turn the power on and quickly begin operation. This may be the case when an emergency communication is intended. In such situations, the time delay associated with a 5 to 10 minute GPS satellite signal acquisition cold-start by a GPS/wireless terminal unit before a position fix can be obtained limits the response time of the system.

Thus, a need remains in the art for a system and method for decreasing the time required to acquire GPS satellite signals and render a position fix in a GPS/wireless terminal unit.

BRIEF SUMMARY

Apparatus and methods of implementing code space search of received signals are described herein. A code space search is implemented as a searcher that performs a subtask that is dynamically reconfigurable at each boundary of an initial integration time. Each particular subtask sets forth a programmable configuration of coherent integration hypothesis that are performed during the initial integration time. The searcher stores the results of the coherent integration hypothesis in a first portion of memory. A search accelerator operates on the initial integration results. The search accelerator can perform coherent integration of various frequency bins of different timing hypothesis, can generate energy values of the coherent integration results, and can generate a non-coherent energy summation. The energy values of the coherent integrations and non-coherent energy summations are stored in a second portion of memory. The ability to reconfigure the subtasks and accelerator operation provides flexibility in search space dimensions.

Aspects of the invention include an apparatus for code space search. The apparatus includes a memory, a searcher configured to perform a plurality of programmable tasks and generate for each programmable task a plurality of coherent integration results obtained over an initial integration time period, an accelerator configured to determine at least one coherent accumulation of searcher integration results based on one or more coherent integration lengths and frequency offsets determined by a selectable search mode, and a data mover configured to transfer the integration results from the searcher to the memory, and configured to transfer integration results from memory to the accelerator.

Aspects of the invention include an apparatus for code space search. The apparatus includes a memory having a portion allocated to code space search, the portion dependent upon an active programmable search mode, and an integrated circuit coupled to the memory. The integrated circuit includes a searcher configured to generate a plurality of coherent integration results determined over an initial integration period for each of a plurality of programmable search tasks, an accelerator configured to determine a coherent accumulation of coherent integration results over a coherent integration length and frequency hypothesis determined by the active programmable search mode, and a data mover configured to perform DMA data transfers between the searcher and memory and between the accelerator and memory.

Aspects of the invention include a method of code space search. The method includes capturing complex samples of a received wireless signal, configuring a plurality of code space search tasks, executing each of the code space search tasks to generate a plurality of coherent integration results obtained over an initial integration time, and determining a coherent accumulation of a plurality of coherent integration results, an integration length and frequency offset associated with the coherent accumulation based on a programmable code space search mode.

Aspects of the invention include a method of code space search. The method includes capturing complex samples of a received wireless signal, executing each of a plurality of code space search tasks to generate a plurality of coherent integration results corresponding to a plurality of code space hypothesis, storing the plurality of coherent integration results in memory, retrieving from memory a number of coherent integration results corresponding to an integration length, and determining a coherent accumulation of the number of coherent integration results.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Figure 1:
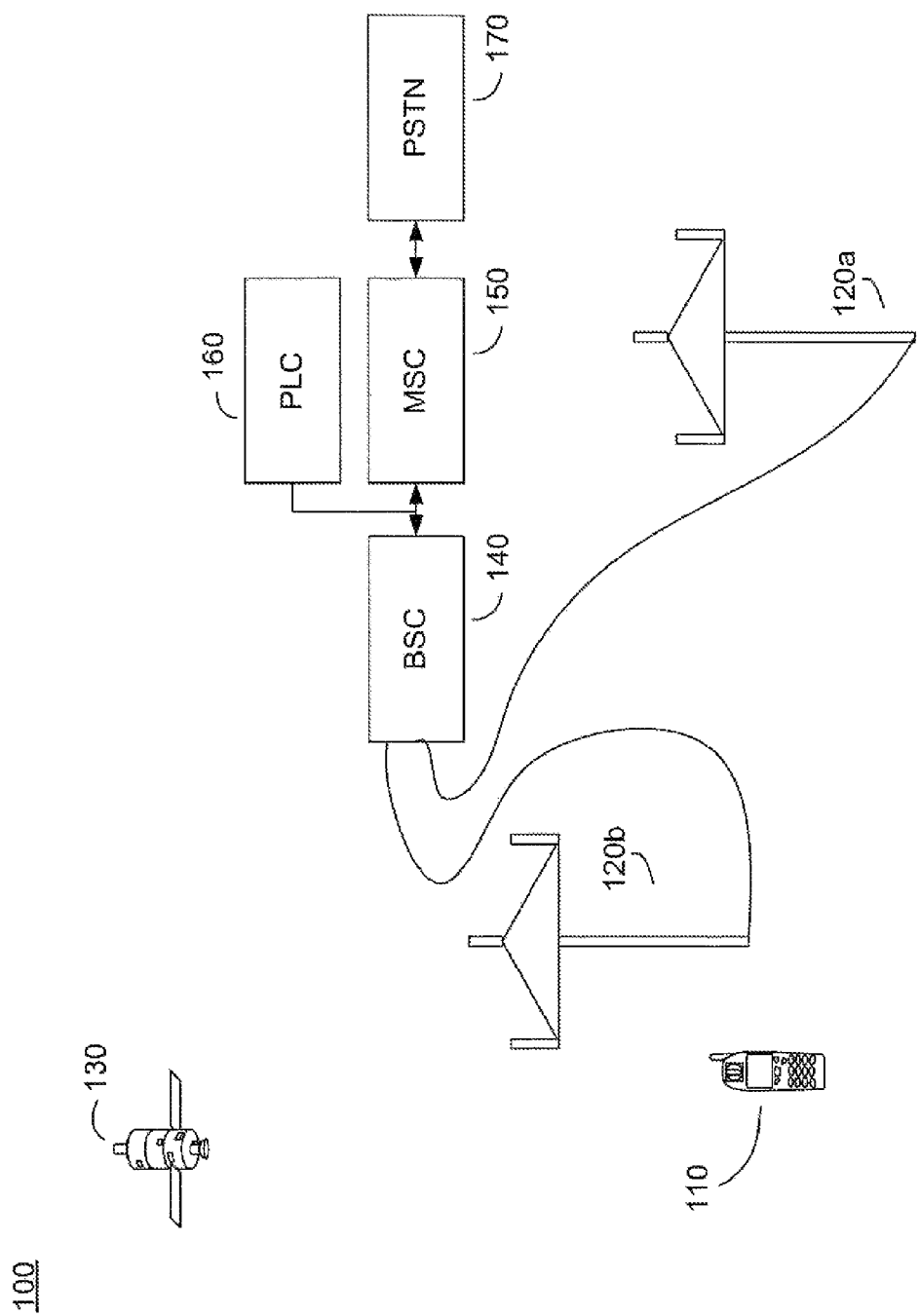
FIG. 1 is a simplified block diagram of an embodiment of a wireless communication system supporting position location.

Dynamically reconfigurable systems and methods of code space search for signal acquisition and tracking in wireless communication environments are described herein. The reconfigurable system includes a sample memory configured to store samples over one or more search increments.

A reconfigurable searcher access the stored samples for code space searching and coherent integration. The reconfigurable searcher includes multiple correlators that can be dynamically configured to support any one of a predetermined number of channels. The configuration of the searcher and the assignment of the correlators to channels can be updated every search increment.

The correlators can generate correlation results for each of the corresponding channel assignments and the searcher can write the results into storage. The size of the storage can be dynamically reallocated, based on a desired coherent integration time.

A data mover accesses the storage device and transfers the searcher results to a sample buffer. The sample buffer can be configured as a double buffer, having a first sample buffer portion and a second sample buffer portion. The data mover alternately writes to one of the first or second buffer portion to permit concurrent reading of the buffer portion that is not being written. The size of the first and second sample buffer portions can be dynamically configured to correspond with an initial integration time that can be the coherent integration time.

An accelerator accesses the correlation results from the sample buffer, and alternately accesses the first and second sample buffer portions in a manner that is complementary to the timing of the writes to sample buffer. The accelerator determines coherent accumulations of the searcher results over an initial integration time that can be dynamically adjusted. The length of the initial integration time can extend beyond a time period of an underlying data modulation. For example, the initial integration time can extend beyond the 20 millisecond data modulation period by tracking the edge transition and received data. The accelerator can selectively invert the correlation results based on the position of the edge transition and the value of the underlying data.

The accelerator can generate an energy or magnitude for each of the coherent accumulation results. The accelerator writes the energy results to an energy buffer. The energy buffer can also be configured as a double buffer, with first and second energy buffer portions. The accelerator can write to a first portion of the energy buffer and can concurrently read from the second energy buffer portion.

The data mover can also be configured to read and write to the energy buffer. The data mover can read the energy results from the energy buffer and write them to storage, and can read prior energy results from storage into the energy buffer.

The accelerator can determine non-coherent integrations by summing multiple energy results. The results are buffered in the energy buffer, and the data mover can store the non-coherent sums in the storage.

FIG. 1 is a simplified block diagram of an embodiment of a wireless communication system 100 supporting position location.

The wireless communication system 100 can include one or more terrestrial elements that can be in communication with a user terminal 110. The user terminal 110 can be, for example, a wireless telephone configured to operate according to one or more communication standards. The one or more communication standards can include, for example, GSM, WCDMA, and CDMA2000. The user terminal 110 can be a portable unit, a mobile unit, or a stationary unit. The user terminal 110 may also be referred to as a mobile unit, a mobile terminal, a mobile station, user equipment, a portable, a phone, and the like.

The user terminal 110 typically communicates with one or more base stations 120a or 120b, here depicted as sectored cellular towers. The user terminal 110 will typically communicate with the base station, for example 120b, that provides the strongest signal strength at a receiver within the user terminal 110. Two base stations 120a and 120b and one user terminal 110 are shown in FIG. 1 for the sake of convenience and clarity. A system typically has numerous base stations and can support more than one user terminal.

The user terminal 110 can determine its position, in part, based on position location signals received from one or more signal sources. The signal sources can include one or more satellites 130, that can be part of a satellite based position location system, such as GPS. The signal sources can also include the one or more base stations 120a or 120b.

The user terminal 110 can determine its location, in part, by determining a pseudo range to each position location signal source. Each position location signal source transmits a position location signal that is spread using a pseudo noise code and the user terminal can determine a pseudo range, in part, by correlating a locally generated pseudo noise code with the received signals to determine a phase of the received pseudo noise signal. The user terminal 110 can determine a pseudo range that correlates with a time or distance based in part on the phase of the received pseudo noise signal.

Each of the base stations 120a and 120b can be coupled to a Base Station Controller (BSC) 140 that routes the communication signals to and from the appropriate base stations 120a and 120b. The BSC 140 can be coupled to a Mobile Switching Center (MSC) 150 that can be configured to operate as an interface between the user terminal 110 and a Public Switched Telephone Network (PSTN) 170. Therefore, the MSC 150 is also coupled to the PSTN 170. The MSC 150 can also be configured to coordinate inter-system handoffs with other communication systems.

A Position Location Center (PLC) 160 can also be coupled to the BSC 140. The PLC 160 can be configured, for example, to store position location information, such as the location of each of the base stations 120a and 120b in the position location system 100. In one embodiment, the PLC 160 can be configured to provide the information to the user terminal 110 such that the user terminal 110 can determine its location based in part on pseudo ranges to multiple signal sources, where the pseudo ranges can be relative time-of-arrival values. In another embodiment, the PLC 160 can be configured to determine the location of the user terminal 110 based on pseudo range information provided by the user terminal 110. In the latter embodiment, a network server (not shown) in the PLC 160 can perform the position location determination in order to offload processing from the user terminal 110.

The PLC 160 can be configured to command the base stations 120a and 120b, via the BSC 140, to generate the position location signals. In other embodiments, the base stations 120a and 120b can be configured to periodically generate the position location signals.

The user terminal 110 can determine, in conjunction with the PLC 160, its position using any one of several position location techniques. The user terminal 110 or PLC 160 can select the technique based in part on the signal sources that are used to generate the pseudo range values. For example, a user terminal 110 may use time of arrival (TOA), time difference of arrival (TDOA), advanced forward link trilateration (AFLT) or some other position location technique. The user terminal 110 or PLC 160 can determine the position of the user terminal 110 by implementing a position location technique that is based on GPS, that augments the GPS signals with terrestrial based beacons such as hybrid position location systems, and that are based on pseudo range values derived from terrestrial based beacons.

In order to generate a first fix, such as upon power up, a receiver in the user terminal 110 configured to process GPS satellite signals needs to search across all satellite PN-code sequences, all PN-code phase hypotheses, and all Doppler frequency offsets in order to receive the necessary satellite signals. This means searching over 24 satellites, a predetermined range of Doppler frequency, and 1023 code hypotheses (which is typically implemented as 2046 discrete half-chip code shifts and calculations). After determining an initial position fix, the user terminal 110 can limit the number of frequencies and code phases searched to a subset that is based on the satellite signals used in determining the initial position fix. The user terminal 110 can reduce the number of discrete satellite PN-code sequences searched from 24 to the set of satellites actually visible, which is typically 8, but may be as few as 4.

However, the user terminal 110 may need to search one or more PN-code sequences for one or more terrestrial beacons if a position fix is not possible solely using GPS satellite information. The code sequences used by the terrestrial beacons are typically distinct from the code sequences used by the GPS satellites. Additionally, the time line and processing of the terrestrial based position location signals are typically distinct from those for GPS.

The user terminal 110 can include a reconfigurable receive signal processor. The reconfigurable signal processor can include multiple independently configurable resources and can support multiple integration times. The independently configurable resources can be configured to perform a search of a selected code space portion over a configurable time. The search results can be coherently integrated over a configurable integration time, furthermore, the integration results can be non-coherently integrated.

The implementation of the reconfigurable receive signal processor in the user terminal 110 permits the user terminal 110 to dedicate resources in a manner efficient for current processing conditions. For example, during initial position fix, the user terminal 110 can configure the reconfigurable receive signal processor to search across a maximum number of position location sources to quickly identify the identity of the position location signal sources. For example, the user terminal 110 can initially search across a predetermined maximum number of GPS satellites to identify which of the GPS satellites originated the received signals. Once the user terminal 110 determines which of the GPS satellites originated received signals, the user terminal 110 can reconfigure the receive signal processor to permit more focused processing of the identified satellite signals. For example, the user terminal 110 can configure a longer coherent integration time to improve the receive sensitivity as well as the frequency selectivity.

Figure 2:
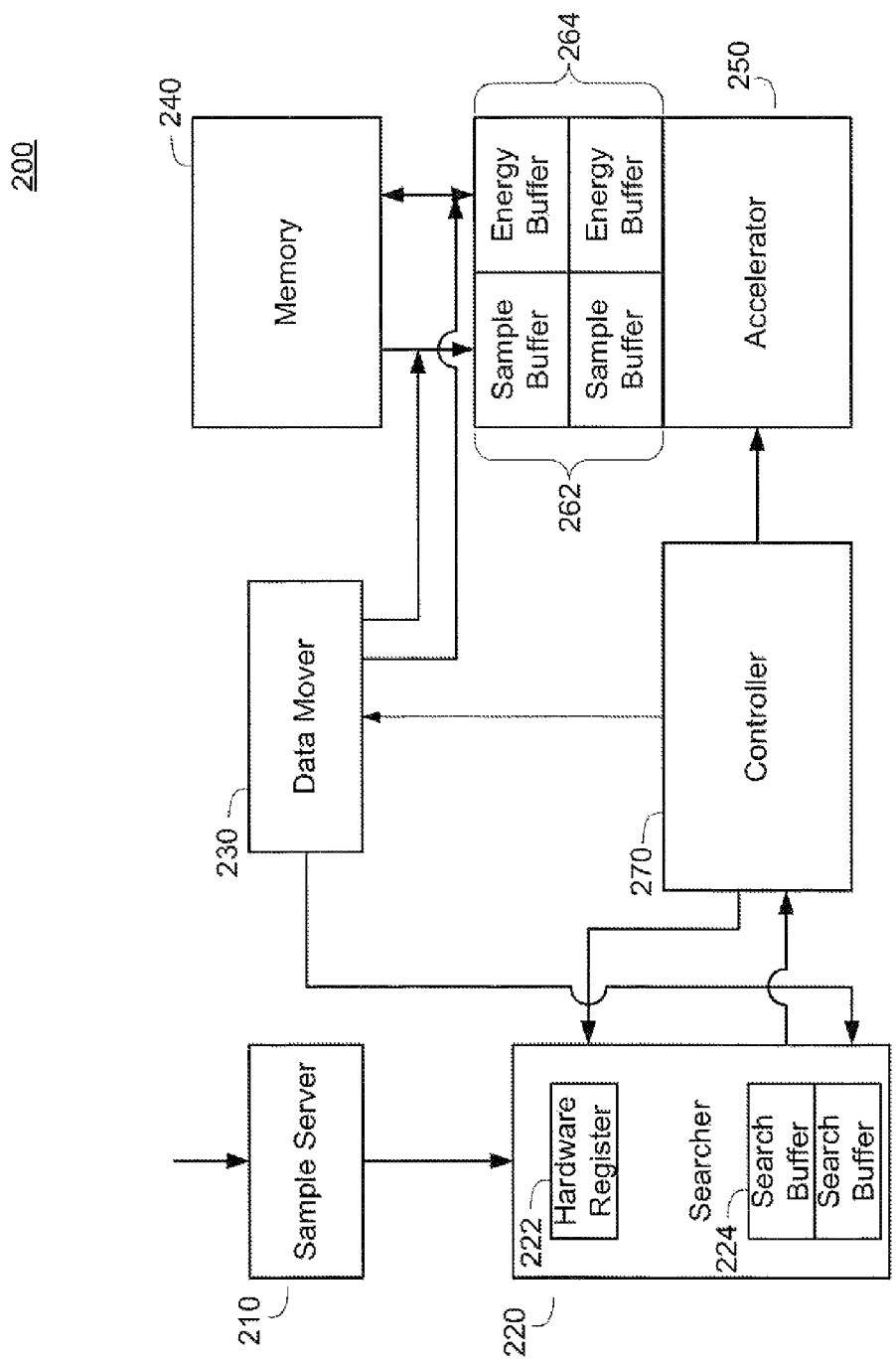
FIG. 2 is a simplified functional block diagram of an embodiment of a position location signal processing system implementing code space search.

FIG. 2 is a simplified functional block diagram of an embodiment of a reconfigurable position location signal processing system 200 implementing code space search. The signal processing system 200 includes a sample server 210 coupled to a searcher 220. The searcher 220 generates results that are stored in a memory 240. An accelerator 250 access the searcher results in memory 240 and performs additional signal processing.

A data mover 230 writes the results from the searcher 220 into the locations within memory 240. The data mover 230 also controls the read and write operations between memory 240 and a buffer 260 associated with the accelerator 250. The buffer 260 can be divided into a sample buffer 262 and an energy buffer 264. Each of the sample buffer 262 and the energy buffer 264 can be configured as double buffers, where data is written to a first portion of the buffer while other data is concurrently read from a second portion of the buffer.

A controller 270 operates to configure the searcher 220 and the accelerator 250. For example, the controller 270 can configure the subtasks performed by searcher 220. The controller 270 can also configure the coherent integration times or lengths as well as the length of non-coherent energy sums performed by the accelerator 250.

The controller 270 can also configure the amount of memory that is needed to store the various correlation values and energy sums. The amount of memory needed to store correlation results is determined, in part, based on the length of a coherent integration and the number of non-coherent energy sums. The controller 270 utilizes the memory resources needed to support the configuration and allows any unused memory to be used for other processes. The controller 240 communicates the dynamic memory map to the data mover 230 to enable the data mover 130 to access the proper memory locations when reading or writing to memory 240.

The sample server 210 is typically implemented as a memory, such as RAM, that temporarily stores complex samples of the received signals. In other embodiments, sample server 210 can include a signal sampler, such as a complex Analog to Digital Converter (ADC) that is configured to sample the received baseband signals and generate in-phase (I) and Quadrature phase (Q) samples.

For example, the sample server 210 can be configured to store up to 4 milliseconds of complex samples taken at twice the chip rate. Of course, the sample server 210 is not limited to samples captured at twice the chip rate, and the actual sample rate may be some other fraction or multiple of a chip rate. For example, the sample server 210 can be configured to store samples that are captured at the chip rate, at four times the chip rate, or some other interval. Where the signal processing system 200 is configured to process received GPS signals, the sampling rate can be approximately 2 MHz. The sample server 210 can be synchronized to a real time clock (not shown) such that the millisecond boundaries of samples stored in the sample server 210 coincide with the GPS millisecond boundaries corresponding to a code period.

The searcher 220 operates on the complex samples stored in the sample server 210. The searcher 220 supports 32 independently configurable subtasks, and each subtask can be reassigned every 1 millisecond. Each subtask searches a 32 chip window across up to 64 distinct hypothesis. The subtasks can be assigned to search the same or different codes corresponding to GPS satellites. Increasing the number of subtasks assigned to searching a code space of a particular satellite decreases the mean search time. The total number of distinct hypothesis and the length of each window can be changed by changing the hardware configuration, and the actual number and configuration of subtasks is not limited to the example described above.

For example, in a GPS code phase search, a subtask can be configured to search a 32 chip window of samples across up to 64 distinct hypothesis. The number of hypothesis searched can be programmable by the controller 270 and can range, for example, from 2 through 64 in multiples of 2.

Prior to performing the code phase searches, the searcher 220 corrects a frequency offset in the received signal. In one embodiment, the searcher 220 can implement a rotator to rotate the search samples to a desired center frequency. The amount of frequency offset compensated by the rotator can be determined based, in part, on a frequency correction loop that can be implemented as a frequency search performed by the signal processing system 200.

The searcher 220 can optionally perform interpolation of the oversampled received chip sequence. The interpolation process can also be referred to as resampling the input signals prior to correlation. In one embodiment, the received signals are sampled at twice the code sequence chip rate (chip×2). A resampler interpolates two successive samples and introduces a variable delay. The variable delay is typically less than one half the chip period, and can be, for example, one fourth the chip period or multiples of a smaller fraction of a chip period. For example, the resampler can introduce a variable delay in multiples of one eighth a chip period, where the multiples range from zero through three.

The searcher 210 220 despreads the 32 chip sequence using each one of the hypothesis, where a hypothesis corresponds to a particular phase of a locally generated PN code sequence. Each hypothesis can be aligned, for example, at half chip boundaries to allow a search of 32 code phase offsets. In another embodiment, each hypothesis can be aligned at a chip boundary, thus allowing a search of 64 distinct code phase offsets. The searcher 210 220 is configured to store each of the complex correlation results in a searcher buffer. The data mover 230 can store the buffered search results to a location in memory 240. In one embodiment, the search buffer 224 is configured as a double buffer. The searcher 220 can be configured to update a first portion of the double buffer while a second portion of the double buffer is accessed by the data mover 230 to move prior searcher results to memory 240. The double buffer configuration allows the searcher 220 be compute limited rather than data transfer limited. By configuring a double buffer, the transfer of previously computed results do not need to complete prior to the next searcher task, and data transfer of prior results may occur concurrently with the processing of the most recent task.

Of course, the searcher 220 is not limited to using a double buffer configuration, and may use some other memory configuration that permits concurrent processing and data transfer. For example, the searcher 220 may implement a circular buffer having a size that is sufficient to permit all data transfers to occur prior to the next update of a particular memory location.

The configuration of the searcher 220, and in particular the configuration of the number of hypothesis and the code space searched, can be configured each correlation increment. In the example described above, the correlation increment occurs every millisecond.

The searcher 220 includes a hardware command register that can be updated each correlation increment. The controller 270 can write a location and size of a task queue to the hardware command register. As noted earlier, the searcher 220 can be controlled to perform up to 32 separate tasks in a single queue.

The searcher 220 is configured to access the queue pointed to by the hardware command register. The searcher 220 can obtain a task queue during processing of a task, and can determine, based on a validity compare value a start time of a task pointed to in the hardware command register.

The accelerator 250 is configured to process the correlation results from the searcher 220. The accelerator 250 can be configured to operate on data stored in a buffer 260 in order to decrease the number of distinct data transfers that need to be initiated. The buffer 260 can include a sample buffer 262 and an energy grid buffer 264. Each of the sample buffer 262 and the energy grid buffer 264 can be arranged as a double buffer in order to eliminate any possible memory contention issues relating to reading and writing of locations in memory 240.

Each double buffer can include first and second portions or banks of memory. At any given time, one bank of the buffer is coupled to the integration engine of the accelerator 250 and the other bank of the buffer is coupled to or otherwise accessible to the data mover 280. The association of the banks with the integration engine or data mover 280 is swapped after each processing interval.

The accelerator 250 includes an integration engine that includes multiple parallel accumulators configured to generate coherent integration sums over a configurable integration time and multiple frequencies. Although the accelerator 250 can be controlled to support virtually any coherent integration length, the accelerator 250 can be optimized to support a discrete set of integration lengths. In one embodiment, the accelerator 250 can be configured to generate coherent integration sums, also referred to as coherent accumulations, over integration times of 10, 20, 39, 80 or 160 msec. Because the searcher 220 generates coherent integration results over 1 millisecond periods, the coherent accumulation time, in milliseconds, corresponds to the coherent integration length. The accelerator 250 can be configured to track bit edges and bit values in order to accommodate integration lengths that extend across one or more bit edges.

The number of parallel accumulation paths is dependent upon the acceptable level of complexity within the accelerator 250. In an embodiment, the accelerator 250 can include, for example, six parallel multiplier-accumulator paths that enable the summation of one set of samples over six distinct frequencies. The operation of the parallel accumulation paths can be repeated to support many frequencies and many sets of samples.

The accelerator buffers 262 can be sufficient for 20 millisecond integrations for all hypothesis of one task. Similarly, the energy buffers 264 can be large enough to support 20 frequencies over each of the 64 time offsets. Integrations longer than 20 milliseconds can be performed by processing a subset of the total number of time offsets in a single operation. When performing 20*N millisecond integrations, N accelerator operations are used. Each operation processes 63/N time hypothesis. Each sample memory holds 20*N milliseconds for each of the 64/N time offsets. Each energy memory holds 20*N frequencies for each of 64/N time offsets. The resulting memory bandwidth and accelerator transaction rate needed to support different integration lengths remains the same.

For example, the accelerator 250 can be configured to concurrently support a 20 millisecond accumulation time over 64 distinct time hypothesis in a single operation or can be configured to support a 160 millisecond accumulation time over 8 distinct time hypothesis in the same single operation. The accelerator 250 can perform 8 separate operations to search the same 64 frequency hypothesis. In this manner, the data bandwidth utilized by the accelerator remains constant regardless of the integration time.

The size of the frequency range spanned by the accelerator 250 is typically 500 Hertz total extending approximately 250 Hertz below and 250 Hertz above a nominal frequency. The number of frequency hypothesis concurrently analyzed by the accelerator 250 varies depending upon the coherent integration length. In one embodiment, the number of frequency hypothesis concurrently processed is set to be equal to the coherent integration length. The accelerator 250 spaces the distinct frequency bins approximately uniformly throughout the frequency span.

The accelerator 250 determines the coherent integration at a particular frequency offset by rotating the input samples by the desired frequency offset and summing over the coherent integration length. The accelerator 250 can then compute the energy of the coherent sum in order to populate a two-dimensional energy grid. The two-dimensional energy grid can include the energy for the current coherent integration length for each time hypothesis and each frequency offset.

The accelerator 250 can be configured to determine the coherent sum for all of the frequencies of a particular time hypothesis before determining a coherent sum of another time hypothesis. Performing the coherent sums in this manner can minimize the number of times that memory is accessed. Of course, in other embodiments, the application of the frequency offset may be more processor intensive, and the coherent sums of each frequency offset across all time hypothesis may be completed prior to determining a coherent sum for another frequency offset. Other embodiments can determine the sums in some other order.

The data mover 230 operates as a DMA engine to transfer information between the searcher 220 and memory 240 and between the memory 240 and the accelerator 250. The data mover 230 performs memory transfers to locations that depend, at least in part, on the search mode and associated integration length. The data mover 230 can determine the memory map based on the task queue from the controller 270.

The data mover 230 copies the coherent sums generated by the searcher 220 for each of the scheduled subtasks. In embodiments where the searcher 220 double buffers the coherent sums, the data mover 230 operates to transfer a block from the buffer that is not being written to by the searcher 220. The data mover 230 is configured to operate on data in the block of the buffer that is not associated with the current subtask operations.

Similarly, the data mover 230 copies previously stored searcher outputs and previously determined energy sums from memory 240 to the buffer 262 in the accelerator 250, and in particular, to a buffer block that is associated with memory transfer and is not being written to by the accelerator 250. The data mover 230 also copies the most recent energy sums from the accelerator buffer to the memory 230.

The controller 270 generates the task queue and associated control information written to the hardware command register of the searcher 220. The controller 270 can configure virtually any search and integration length that can be supported by available space in memory 240. However, the controller 270 typically has a predetermined number of search configurations or modes that can be selected and programmed at each control boundary. For example, the controller 270 can select one of a high search mode spanning 1600 Hz, 20 distinct frequency bins, 64 hypothesis, and a coherent length of 20, a first low search mode spanning 400 Hz, 80 distinct frequency bins, 16 hypothesis, and a coherent length of 80, a second low search mode spanning 200 Hz, 160 distinct frequency bins, 8 hypothesis, and a coherent length of 160, a coarse acquisition search mode spanning 1600 Hz, 20 distinct frequency bins, 64 hypothesis, and a coherent length of 10, and a bit edge search mode spanning 1600 Hz, 8 distinct frequency bins, 8 hypothesis, and a coherent length of 20.

Figure 3:
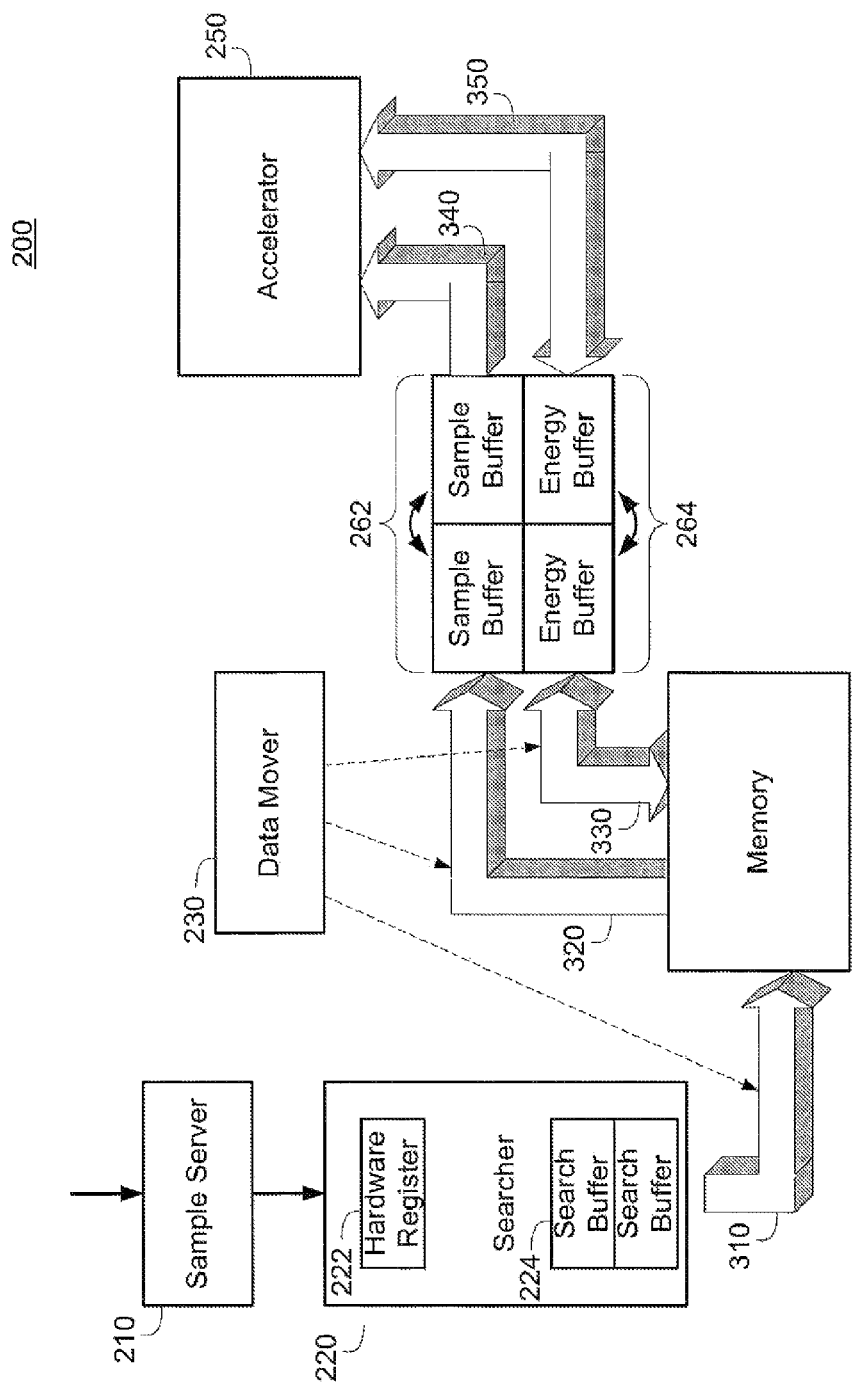
FIG. 3 is a simplified functional block diagram illustrating an embodiment of data flow in a receiver implementing code space search.

FIG. 3 is a simplified functional block diagram illustrating an embodiment of data flow in a receiver implementing position location signal processing system 200 for code space search. The system 200 is described in the context of processing a GPS code space search. However, a similar code space search can be processed for some other PN code spread information, such as for AFLT.

The sample server 210 receives complex input samples at approximately twice a chip rate and writes the samples to memory, such as RAM. The sample server 210 can be configured to arrange the RAM as a circular buffer and overwrite the oldest entries with the most recent samples.

The searcher 220 examines the contents of the hardware command register to determine the location and size of a task queue. The hardware command register in the searcher 220 can be programmed during processing of a task queue pointed to by a previous hardware command register contents. The searcher 220 determines a start time for the nest scheduled search task, and can start the new search task as soon as the current search task is finished.

Each task queue can control up to a predetermined maximum number of subtasks that can be processed in the initial search period, which can be one millisecond. The searcher 220 processes the subtasks and writes the coherent sums for each hypothesis to a buffer within the searcher 220. The searcher buffer can be organized as a double buffer. The two blocks of the searcher double buffer can alternately be associated with one of the searcher 220 or the data mover 230. The block associated with the searcher 220 receives the correlation results produced by the searcher 220, while the block associated with the data mover 230 permits block data transfers from the searcher 220 to memory 240. The association of the blocks in the searcher double buffer are swapped at predetermined times. For example, the association of the blocks can be swapped once the searcher 220 fills its associated block.

The data mover 230 performs a data transfer 310 between the associated searcher 220 buffer and memory 240. The data mover 230 need not synchronize the data transfer 310 with the coherent integration processing performed in the searcher 220. Instead, the data mover 230 can be configured to perform the data transfer 310 at any time during which the buffer block association is valid. The data mover 230 determines the locations within memory 240 to write the values, based at least in part, on an active search mode initiated by the controller (not shown). The size of memory 240 allocated to the system 200 can be dynamic, and can vary, for example, based on the active code search mode. As an example, a bit edge search mode spanning 1600 Hz, 8 distinct frequency bins, 8 hypothesis, and a coherent length of 20 requires less storage space memory 240 than does a low search mode spanning 200 Hz, 160 distinct frequency bins, 8 hypothesis, and a coherent length of 160.

If the memory 240 is shared with processes distinct from code space searching, such as where the memory 240 is system memory for a wireless communication device, the dynamic allocation of memory space maximizes the amount of memory space available to support tasks distinct from code search. The system 200 need only be allocated sufficient memory 240 space to support the active code search mode.

The data mover 230 can also control data transfer 320 of the searcher results stored in memory into a double buffered sample buffer 262. Because the accelerator 250 consumes the searcher results during coherent integration, the data transfer 320 to sample buffer 262 can be unidirectional, from memory 240 to the sample buffer 262.

The double buffered sample buffer 262 can alternate associations of first and second blocks between the data mover 230 and the accelerator 250. The accelerator 250 controls the read operations 340 from its associated sample buffer 262 block. The data mover 230 and accelerator 250 can swap sample buffer 262 block associations once the accelerator 250 accesses all of the data in its associated sample buffer 262 block.

The accelerator 250 determines a coherent sum of the searcher results over a coherent accumulation length that is determined based on the search mode programmed by the controller. The accelerator 250 can generate an energy value for each coherent integration by summing the squares of the complex components of the coherent integration result.

The accelerator 250 can write the energy values to an energy buffer 264 for transfer to memory 240. Alternatively, the accelerator 250 can be configured to generate non-coherent accumulations of the energy values, by summing the current energy value with prior energy values computed for the same energy grid location.

The accelerator 250 controls the data transfer 350 of energy values to and from an associated block of a double buffered energy buffer 264. The energy buffer 264 can be configured as a double buffer with blocks alternatively associated with one of the data mover 230 or the accelerator 250.

The data mover 230 controls data transfers 330 of energy values between memory 240 and the associated block of the energy buffer 264. Similarly, the accelerator 250 controls energy buffer read and write operations 350 between its associated block of the energy buffer 350. The associations of the blocks of the energy buffer 264 can be swapped based on a schedule determined by the active search mode.

The data mover 230 can access prior stored energy results from memory 240 and can copy the values to the associated block of energy buffer 264 in a data transfer operation 330. After the block associations swap, the accelerator 250 can access the energy values previously transferred by the data mover 230 and can, for example, determine non-coherent accumulations using current energy values. The accelerator 250 controls the write operation 350 back to its block of energy buffer 264. The data mover 130 can perform a data transfer 330 of the updated energy values from the energy buffer 264 to memory 240 when the blocks of the energy buffer 264 are again swapped.

The accelerator 250 processing can be performed in a pipelined fashion in order to more efficiently process data. The pipelined process can be, for example, a pipeline of three distinct operations. The pipeline can support input data transfer for one operation, processing of coherent accumulations and energy values for a second operation, and data transfer of prior results from the accelerator 250 to memory 24 for a third operation.

Thus, the data mover 230 can transfer searcher results from memory to the sample buffer (operation N+1) while the accelerator 250 is operating on searcher results for a previous data transfer (operation N). Additionally, the data mover 230 can transfer accumulated energy sums from the energy buffer to memory 240 for a third distinct operation (operation N−1) before loading the energy buffer with previously stored values from external memory 240 (operation N+1).

Figure 4:
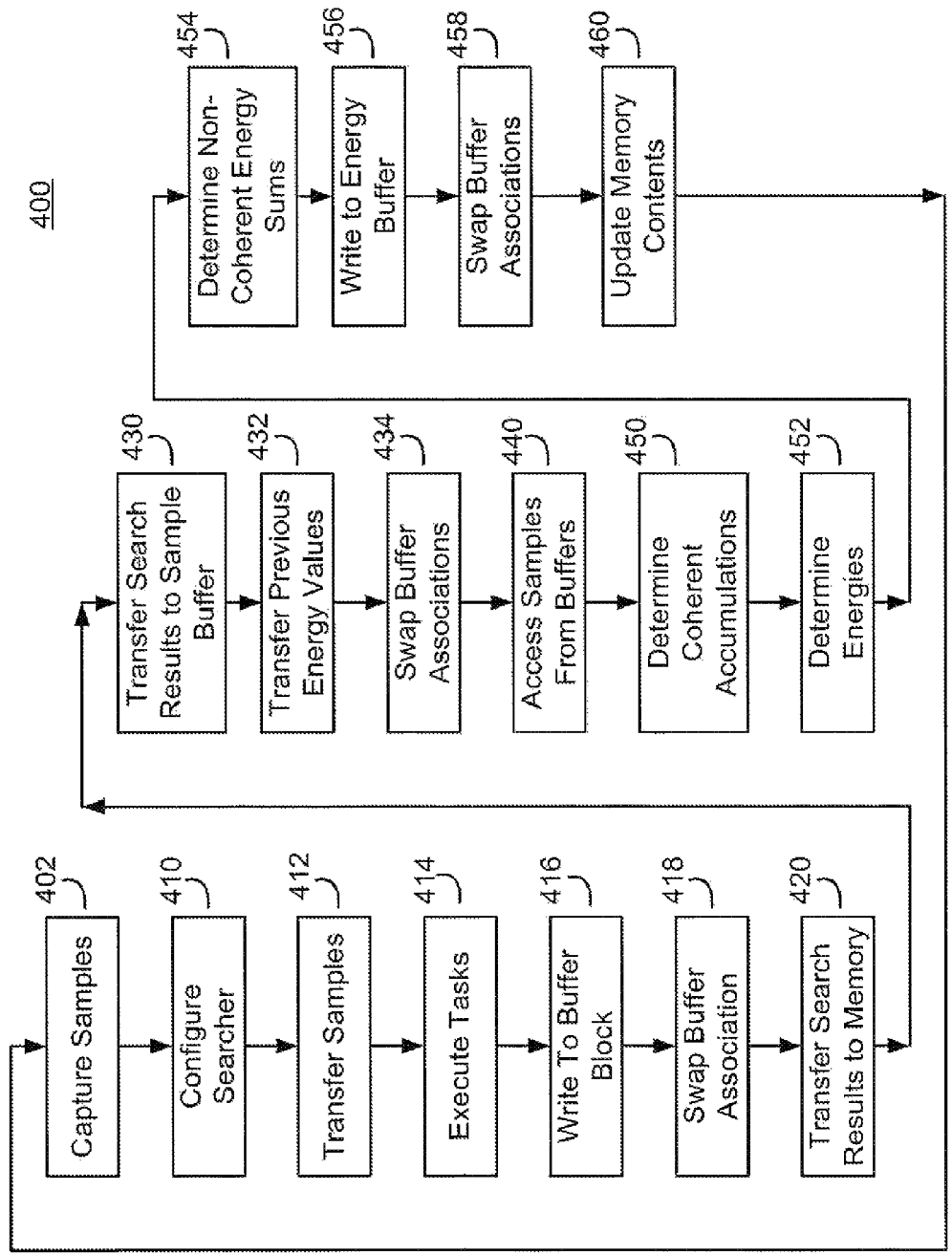
FIG. 4 is a flowchart of an embodiment of a method of code space search.

FIG. 4 is a flowchart of an embodiment of a method 400 of code space search. The method 400 can be implemented by the position location signal processing system of FIG. 2 and can be implemented within a user terminal of FIG. 1. The method 400 illustrates the process extending across functional blocks. The sequence of operations in the method 400 illustrates the processing of a set of samples throughout the system. Multiple operations in the system may occur concurrently in order to enable continuous operation of the method without latency for reconfiguration or data transfer.

The method 400 begins a t block 402, where the system captures complex samples of the received signal that is to be searched. For example, a signal sampler can sample received GPS signals at a rate that is approximately twice the PN code rate. The complex samples can be stored in RAM, or some other storage device.

The system proceeds to block 410, where a searcher is configured to support a particular code search processing mode. The searcher can determine a processing mode for future samples while processing samples according to a current processing mode. For example, the searcher can read a hardware command register to determine the location and size of a task queue. The searcher can perform the tasks of the task queue at a task boundary or when the processing of the current task has completed. The task queue can include multiple tasks up to a predetermined maximum number of tasks. For example, a task queue can include up to a maximum of 32 tasks for the searcher to perform in each initial integration time period, which can be 1 millisecond.

Each search task can support a search across a predetermined number of code chips over multiple hypothesis. The number of hypothesis searched can be programmable, and can range up to a predetermined maximum number of hypothesis. For example, each task can be configured to search a window containing 32 code chips and can be configured to search up to 64 distinct hypothesis across the search window, where each code space hypothesis can be offset from its nearest hypothesis by one half of a chip period.

The system proceeds to block 412 and transfers from the sample memory to the searcher the samples that are relevant to the search configuration. Using the examples provided above, the searcher can conceivably be configured to search an entire code space of a single satellite vehicle in one initial integration time period of 1 millisecond. However, the searcher is more typically configured to search the received samples over a portion of multiple codes.

After transferring the relevant samples, the system proceeds to block 414 and executes the tasks as set forth in the task queue. Each task results in a coherent integration of the samples over an initial integration period of 1 millisecond across each of the hypothesis applied by the tasks, although other embodiments may use other initial integration periods.

The searcher proceeds to block 416 and writes the coherent integration results from each hypothesis to an associated block of a double buffer. The double buffer includes two blocks alternately associated with one of the searcher or a data mover. The searcher writes to its associated buffer block to allow the data mover to transfer data from its associated buffer block. By double buffering the searcher outputs, both the searcher and the data mover avoid memory contention in accessing data from the buffer. Previously buffered results can be read from one portion of the double buffer while the searcher operates on samples and writes to the other portion of the double buffer. The double buffer permits more flexible data transfer, as the transfer of prior searcher results does not need to complete prior to the start of the next searcher operation. Additionally, the transfer of results to memory can be more flexibly scheduled if the DMA memory transfers by the data mover can be accomplished in less time than is used to populate the searcher results.

Because transfer of results only occurs from the block of search buffer associated with the data mover, the system proceeds to block 418 and swaps the association of the blocks of the double buffer. Swapping the association of the blocks enables transfer of the most recent results to memory while ensuring that a block of the buffer remains available for storage of the current integration results.

After swapping the block associations of the searcher double buffer, the system proceeds to block 420 where the data mover transfers the initial coherent integration results from the searcher to memory. In one embodiment, the memory is shared with other processes, and the data mover performs a DMA transfer of the searcher buffer to locations in the shared memory.

After transferring the searcher results to memory, the system proceeds to block 420430. At block 420430, the data mover transfers at least a portion of the searcher results from memory to an associated block of a sample buffer for processing by the accelerator. The sample buffer is also configured as a double buffer, with each block of the sample buffer associated with one of the data mover or accelerator. The sample buffer block associations are swapped after a predetermined event, which can be filling of a buffer, timing, or some other event.

The system proceeds to block 432 and transfers at least a portion of previous energy accumulations from memory to an associated block of an energy buffer for access by the accelerator. The system may also move updated results from the energy buffer back to memory prior to transferring energy accumulations that are to be updated from memory to the energy buffer. The energy buffer is also configured as a double buffer. One block of the double buffer is associated with the data mover and the other block of the double buffer is associated with the accelerator. The energy buffer associations can be swapped after a predetermined event that may be distinct from the event initiating swapping of the sample buffer blocks.

The accelerator only accesses the blocks of the sample buffer and energy buffer with which it is associated. Thus, the system proceeds to block 434 and swaps the associations of the sample buffer and energy buffer to enable the accelerator to access the most recent values transferred from memory by the data mover. Additionally, the data mover can access the most recent energy results from the accelerator. The accelerator consumes the searcher results and does not rewrite results to the search buffer. Therefore, the swap of the search buffer blocks enables additional space for data mover transfers to the samples buffer.

After swapping the buffer associations, the system proceeds to block 450 and determines the coherent accumulations for the search results accessible in the associated sample buffer. The accelerator determines the coherent accumulation based on the active code search mode. The accelerator may need to wait for multiple swaps of the sample buffer in order to support the desired integration length, depending on the size of the sample buffer.

If the integration length crosses a data boundary, such as a 20 millisecond data boundary used in GPS signals, the accelerator can track the occurrence of the bit boundary and can compensate for the bit value in computing the accumulation.

The accelerator can also determine coherent accumulations across multiple frequency bins, based on the active search mode. The accelerator can include multiple parallel paths that enable concurrent accumulation across multiple frequencies, or multiple searcher results.

The system proceeds to block 452 and determines the energy associated with each coherent accumulation. The accelerator can determine the energy associated with the complex accumulation value, for example, by summing the squares of the in-phase and quadrature values. In some embodiments, the accelerator may omit determining the accumulated energy and may instead store the complex accumulation value in the energy buffer. In embodiments where the accelerator stores coherent accumulation sums to the buffer rather than energy values, the operations in blocks 452-454 may be omitted. The accelerator may directly update the energy buffer with the coherent accumulation values.

The system proceeds to block 454 and determines any non-coherent energy accumulations that may be specified by the code search mode. In order to determine a non-coherent accumulation, the accelerator reads the prior energy value from a desired portion of an energy grid stored in the energy buffer and sums the corresponding energy value. In some embodiments, the accelerator may determine a weighted sum and may scale the prior accumulated energy sum by a predetermined fraction prior to summing the most recent energy value.

The system proceeds to block 456 where the accelerator writes the accumulated energy value back to the energy buffer. The system typically does not have direct access to the block of energy buffer associated with the accelerator. Thus, the system proceeds to block 458 to await the next occurrence of swapping the energy block associations.

At block 460, the data mover has access to the most recent energy values updated by the accelerator. The data mover can perform a DMA transfer of the updated energy accumulations to memory. The data mover may also load any energy values from memory into the energy buffer to support the next non-coherent accumulation.

After block 460, processing of particular received samples have completed one entire processing path, from sampling to energy accumulation. The double buffering and memory storage of the various intermediate values permits the entire process to run substantially continuously. The system does not need to halt or otherwise wait for changes in search configuration, because the searcher can be reconfigured at every initial accumulation boundary, while the searcher is operating on previously scheduled tasks. The double buffering of searcher results in both the searcher and the input to the accelerator virtually eliminates memory contention, while increasing the flexibility in accessing memory, which can be shared memory external to the module or integrated circuit having the searcher and accelerator.

Separating the initial coherent integration from the longer coherent integration corresponding to a desired integration length permits more flexibility in the scheduling and configuration of the system. The one millisecond integration results from the searcher can be used to support virtually any integration length.

Figure 5:
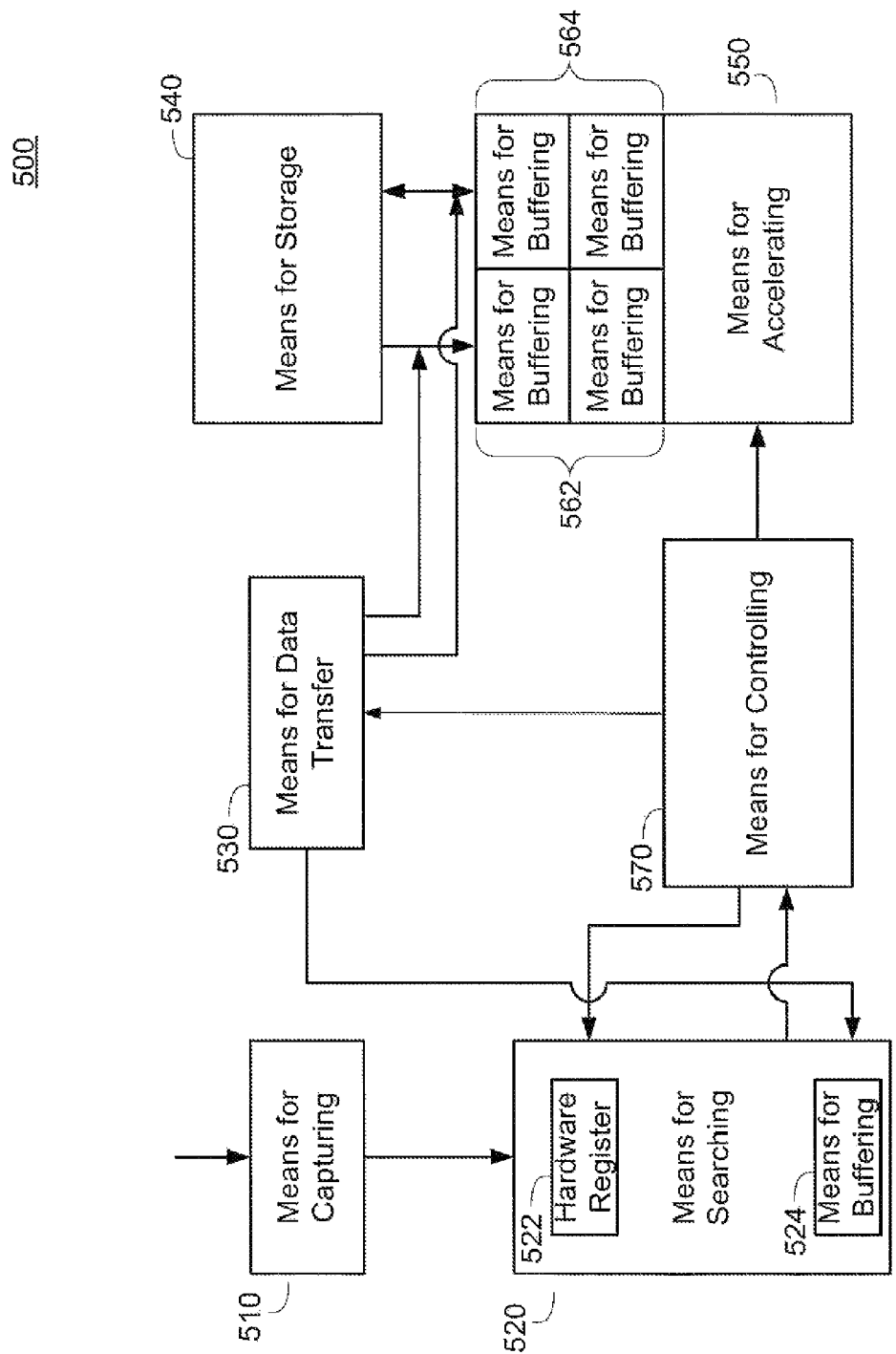
FIG. 5 is a simplified functional block diagram of an embodiment of a position location signal processing system implementing code space search.

FIG. 5 is a simplified functional block diagram of an embodiment of a position location signal processing system 500 implementing code space search. The system 500 of FIG. 5 can be implemented, for example, within a user terminal of FIG. 1.

The system 500 includes a means for capturing 510 complex samples of a received wireless signal. The means for capturing 510 the complex samples is coupled to a means for searching 520.

The means for searching 550 can operate according to each of the code space search tasks pointed to by the hardware register 522 that operates as a means for configuring a plurality of code space search tasks. The means for searching 550 generates a plurality of coherent integration results obtained over an initial integration time, which can be one millisecond. The means for searching 550 can be configured to generate a plurality of coherent integration results corresponding to a plurality of code space hypothesis, as defined in the search tasks.

A means for controlling 570 controls the value written to the hardware register 522. The value in the hardware register 522 can point to, for example, a task queue in memory that is determined based on a code space search mode. A means for data transfer 530 is coupled to the means for searching 520 and operates to transfer the plurality of coherent integration results to a means for storage 540. The means for data transfer 530 also operates to transfer the plurality of coherent integration results from the means for storage 540 to means for buffering 562 and 564 within or otherwise coupled to a means for accelerating 550. In particular, the means for data transfer 530 transfers a number of coherent integration results corresponding to an integration length.

The means for accelerating 550 operates as a means for determining a coherent accumulation of a plurality of coherent integration results. The integration length and frequency offset associated with the coherent accumulation is based on a programmable code space search mode.

Systems, apparatus, and methods of code space searching have been described herein. The described systems, apparatus, and methods can be implemented in a user terminal to process GPS signals, AFLT signals, and the like or some other code spread signal. For example, the code space search process and apparatus are applicable to searching any code space of a received spread spectrum signal. Although particular embodiments describe application to GPS signals, the claimed subject matter is generic to code space search, and are not limited to GPS. A searcher is configured to determine coherent integration results over initial integration times or periods. The searcher results are used as intermediate values for further coherent integration and non-coherent energy accumulation performed in an accelerator.

Intermediate values are stored in double buffers to enable efficient and non-contentious data transfers to memory. The use of double buffering permits reconfiguration of the code search modes with low or no latency.

Additionally, the separation of processing following coherent integration over the initial integration period permits flexible reconfiguration of code space search modes without requiring redundant acquisition and analysis of data. The ability to reconfigure the code space search in virtually real time permits more efficient code space searches and permits reconfiguration from fast code acquisition to high sensitivity code space searching.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus for code space search, the apparatus comprising:
   a memory;
   a searcher configured to perform a plurality of programmable tasks and generate for each of the programmable tasks a plurality of coherent integration results obtained over an initial integration time period, each of the programmable tasks being dynamically reconfigurable at a boundary of the initial integration time;
   an accelerator configured to determine at least one coherent accumulation of searcher integration results based on one or more coherent integration lengths and frequency offsets determined by a selectable search mode; and
   a data mover configured to transfer the integration results from the searcher to the memory, and configured to transfer the integration results from memory to the accelerator.

2. The apparatus of claim 1, wherein the searcher comprises a double buffered searcher results buffer, where each block of the double buffered searcher results buffer is associated with one of the searcher or the data mover.

3. The apparatus of claim 1, wherein the searcher is configured to perform up to 32 tasks in one initial integration period.

4. The apparatus of claim 1, wherein each task specifies a number of code phase hypothesis of an associated code, and wherein each of the plurality of coherent integration results is based on one of the number of code phase hypothesis.

5. The apparatus of claim 1, wherein the initial integration period comprises a code period.

6. The apparatus of claim 1, wherein the initial integration period comprises approximately one millisecond.

7. The apparatus of claim 1, wherein the searcher is configured to determine plurality of programmable tasks based on a task queue that can be updated every initial integration period.

8. The apparatus of claim 7, wherein the searcher is configured to determine a task queue for a future initial integration period during processing of tasks in a task queue corresponding to a current initial integration period.

9. The apparatus of claim 1, wherein the accelerator is further configured to generate an energy value for each of the at least one coherent accumulation.

10. The apparatus of claim 9, wherein the accelerator is further configured to generate a non-coherent integration of energy values.

11. The apparatus of claim 1, wherein the accelerator is configured to generate the at least one coherent accumulation across a frequency span that is less than or equal to approximately 500 Hertz.

12. The apparatus of claim 1, wherein the accelerator comprises a double buffer, where each block of the double buffer is associated with one of the accelerator or the data mover, and wherein access by the accelerator and data mover are limited to the block of the double buffer with which it is associated.

13. The apparatus of claim 1, wherein a number of frequency offset is determined, based in part, on the integration length.

14. An apparatus for code space search, the apparatus comprising:
   a memory having a portion allocated to code space search, the portion dependent upon an active programmable search mode; and
   an integrated circuit coupled to the memory, the integrated circuit comprising:
   a searcher configured to generate a plurality of coherent integration results determined over an initial integration period for each of a plurality of programmable search tasks, each of the programmable search tasks being dynamically reconfigurable at a boundary of the initial integration time;
   an accelerator configured to determine a coherent accumulation of coherent integration results over a coherent integration length and frequency hypothesis determined by the active programmable search mode; and
   a data mover configured to perform DMA data transfers between the searcher and memory and between the accelerator and memory.

15. The apparatus of claim 14, wherein each search task specifies a set of code hypothesis selected from a code.

16. The apparatus of claim 14, wherein the searcher is configured to support up to 32 distinct search tasks in one initial integration period.

17. The apparatus of claim 14, wherein the data mover is configured to perform data transfers from memory to an associated block of a double buffered sample buffer of the accelerator.

18. The apparatus of claim 14, wherein the data mover is configured to perform data transfers to memory from an associated block of a double buffered searcher buffer of the searcher.

19. A method of code space search, the method comprising:
   capturing complex samples of a received wireless signal;
   configuring a plurality of code space search tasks, each of the code space search tasks being dynamically reconfigurable at a boundary of an initial integration time;

executing each of the code space search tasks to generate a plurality of coherent integration results obtained over the initial integration time; and determining a coherent accumulation of a plurality of coherent integration results, an integration length and frequency offset associated with the coherent accumulation based on a programmable code space search mode.

20. The method of claim 19, further comprising determining an energy of the coherent accumulation.

21. The method of claim 19, further comprising:
determining an energy of the coherent accumulation; and
determining a non-coherent integration of an energy grid position corresponding to the energy.

22. The method of claim 21, further comprising:
storing the non-coherent integration in a block of an energy double buffer associated with an accelerator:
swapping an association of the block of the energy double buffer to a data mover; and
transferring the non-coherent integration from the block of the energy double buffer to a memory.

23. The method of claim 19, further comprising storing the plurality of coherent integration results in a block of a searcher double buffer associated with a searcher.

24. The method of claim 23, further comprising:
swapping an association of the block of the searcher double buffer to a data mover; and
transferring coherent integration results from the block of the searcher double buffer to a memory.

25. The method of claim 19, wherein executing each of the code space search tasks comprises:
determining a plurality of code space hypothesis; and
correlating each of the code space hypothesis to at least a portion of the complex samples.

26. The method of claim 19, wherein determining the coherent accumulation comprises:
transferring the plurality of coherent integration results from a memory to a first block of a sample double buffer;
swapping an association of the first block of the double buffer to an accelerator; and
determining the coherent accumulation of the plurality of coherent integration results in the first block.

27. A method of code space search, the method comprising:
capturing complex samples of a received wireless signal;
executing each of a plurality of code space search tasks to generate a plurality of coherent integration results corresponding to a plurality of code space hypothesis, each of the code space search tasks being dynamically reconfigurable at a boundary of an initial integration time;
storing the plurality of coherent integration results in memory;
retrieving from memory a number of coherent integration results corresponding to an integration length; and
determining a coherent accumulation of the number of coherent integration results.

28. The method of claim 27, further comprising determining an energy of the coherent accumulation.

29. The method of claim 27, further comprising determining a non-coherent energy integration based on an energy of the coherent accumulation.

30. The method of claim 27, wherein executing each of the plurality of code space search tasks comprises determining a correlation of a plurality of code hypothesis to at least a portion of the complex samples.

31. The method of claim 27, wherein storing the plurality of coherent integration results in memory comprises:

storing at least a portion of the plurality of coherent search results in a block of a double buffer;
swapping an association of the block of the double buffer; and
transferring the portion of the plurality of coherent search results from the block of the double buffer to memory.

32. An apparatus for code space search, the apparatus comprising:
means for capturing complex samples of a received wireless signal;
means for configuring a plurality of code space search tasks, each of the code space search tasks being dynamically reconfigurable at a boundary of an initial integration time;
means for searching according to each of the code space search tasks to generate a plurality of coherent integration results obtained over the initial integration time; and
means for determining a coherent accumulation of a plurality of coherent integration results, an integration length and frequency offset associated with the coherent accumulation based on a programmable code space search mode.

33. An apparatus for code space search, the apparatus comprising:
means for capturing complex samples of a received wireless signal;
means for searching the complex samples according to each of a plurality of code space search tasks to generate a plurality of coherent integration results corresponding to a plurality of code space hypothesis, each of the code space search tasks being dynamically reconfigurable at a boundary of an initial integration time;
means for storing the plurality of coherent integration results;
means for transferring a number of coherent integration results corresponding to an integration length; and
means for determining a coherent accumulation of the number of coherent integration results.

34. A non-transitory computer-readable storage medium containing instructions stored thereon, which, when executed by an apparatus for code space search, cause the apparatus to perform actions, the instructions comprising:
program code to capture complex samples of a received wireless signal;
program code to configure a plurality of code space search tasks, each of the code space search tasks being dynamically reconfigurable at a boundary of an initial integration time;
program code to search according to each of the code space search tasks to generate a plurality of coherent integration results obtained over the initial integration time; and
program code to determine a coherent accumulation of a plurality of coherent integration results, an integration length and frequency offset associated with the coherent accumulation based on a programmable code space search mode.

35. A non-transitory computer-readable storage medium containing instructions stored thereon, which, when executed by an apparatus for code space search, cause the apparatus to perform actions, the instructions comprising:
program code to capture complex samples of a received wireless signal;
program code to search the complex samples according to each of a plurality of code space search tasks to generate a plurality of coherent integration results corresponding to a plurality of code space hypothesis, each of the code space search tasks being dynamically reconfigurable at a boundary of an initial integration time;
program code to store the plurality of coherent integration results;
program code to transfer a number of coherent integration results corresponding to an integration length; and program code to determine a coherent accumulation of the number of coherent integration results.

* * * * *